United States Patent
Yule et al.

(10) Patent No.: US 8,614,641 B2
(45) Date of Patent: Dec. 24, 2013

(54) HYBRID SATELLITE POSITIONING WITH PREDICTION

(75) Inventors: Andrew Thomas Yule, East Grinstead (GB); Ian Michael Simmons, Hassocks (GB)

(73) Assignee: U-Blox A.G., Thalwil (CH)

( * ) Notice: Subject to any disclaimer, the term of this patent is extended or adjusted under 35 U.S.C. 154(b) by 175 days.

(21) Appl. No.: 13/160,424

(22) Filed: Jun. 14, 2011

(65) Prior Publication Data

US 2012/0306689 A1 Dec. 6, 2012

(30) Foreign Application Priority Data

Jun. 1, 2011 (EP) .................................... 11168462

(51) Int. Cl.
*G01S 19/45* (2010.01)
(52) U.S. Cl.
USPC .................................... 342/357.28
(58) Field of Classification Search
USPC .................................... 342/357.28
See application file for complete search history.

(56) References Cited

U.S. PATENT DOCUMENTS

| | | | |
|---|---|---|---|
| 5,515,043 A | 5/1996 | Berard et al. | |
| 5,874,914 A | 2/1999 | Krasner | |
| 6,295,024 B1 | 9/2001 | King et al. | |
| 6,590,525 B2 | 7/2003 | Yule et al. | |
| 7,564,406 B2 | 7/2009 | Han | |
| 2001/0017599 A1 | 8/2001 | Yule et al. | |
| 2005/0162312 A1 | 7/2005 | Riday | |
| 2006/0038719 A1 | 2/2006 | Pande et al. | |
| 2007/0161380 A1 | 7/2007 | Fok et al. | |
| 2008/0094499 A1 | 4/2008 | Ueno et al. | |
| 2008/0240315 A1 | 10/2008 | De Mey et al. | |
| 2008/0262728 A1 | 10/2008 | Lokshin et al. | |

(Continued)

FOREIGN PATENT DOCUMENTS

| | | |
|---|---|---|
| EP | 1 260 830 | 11/2002 |
| GB | 2463481 | 3/2010 |

(Continued)

OTHER PUBLICATIONS

Office Action dated Aug. 23, 2013, cited in U.S. Appl. No. 13/160,427.

*Primary Examiner* — Harry Liu
(74) *Attorney, Agent, or Firm* — Blakely Sokoloff Taylor & Zafman (57) ABSTRACT

A method of calculating two position fixes, using satellite positioning. The method comprises: using an RF front-end (12), receiving satellite positioning signals; using an analogue-to-digital converter (18), sampling the received signals to generate signal samples; using a processor (20), processing a first set of the samples as they are generated, to calculate a first position fix; storing information associated with the calculation in a memory (22); storing a second set of the samples, or ranging measurements derived from the second set of samples, in the memory (22) for later processing to calculate a second position fix; and later, processing the second set of samples to calculate the second position fix, wherein the calculation of the second position fix is assisted by the information associated with the calculation of the first position fix. Also disclosed are other related methods and apparatus.

15 Claims, 4 Drawing Sheets

(56) References Cited

U.S. PATENT DOCUMENTS

2009/0135057 A1    5/2009   Vollath et al.
2009/0267834 A1   10/2009   Dooley et al.
2010/0321236 A1   12/2010   Diggelen et al.
2011/0032148 A1*   2/2011   Peeters et al. ............ 342/357.77
2011/0037652 A1    2/2011   Stafford
2011/0148697 A1*   6/2011   Thiel et al. ............... 342/357.26
2011/0202576 A1*   8/2011   Seshadri et al. ............. 707/812

FOREIGN PATENT DOCUMENTS

| WO | WO 2004/090903 A1 | 10/2004 |
| WO | WO 2006/018803 A1 | 2/2006 |
| WO | WO 2007/082214    | 7/2007 |
| WO | WO 2007/096801 A1 | 8/2007 |
| WO | WO 2009/000842 A1 | 12/2008 |
| WO | WO 2010/029347 A1 | 3/2010 |

* cited by examiner

HYBRID SATELLITE POSITIONING WITH PREDICTION

This invention relates to a receiver for a Global Navigation Satellite System (GNSS) and to methods of processing satellite signals that have been received by such a receiver. It is particularly relevant to the Global Positioning System (GPS).

GPS is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just less than 24 hours.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This information is essential to a GPS receiver for determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional, real-time GPS receiver reads the transmitted data message and saves the ephemeris, almanac and other data for continual use.

To determine position, a GPS receiver compares the time a signal was transmitted by a satellite with the time it was received by the GPS receiver. The time difference tells the GPS receiver how far away that particular satellite is. The ephemeris for that satellite enables the GPS receiver to accurately determine the position of the satellite. By combining distance measurements from multiple satellites with the knowledge of their positions, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude. The information received from the satellites can also be used to set (or correct) the real-time clock (RTC) within the GPS receiver.

By processing the apparent Doppler shifts of the signals from the satellites, a GPS receiver can also accurately provide speed and direction of travel (referred to as 'ground speed' and 'ground track', respectively).

A complete data signal from the satellites consists of a 37,500 bit Navigation Message, which takes 12.5 minutes to send at 50 bps. The data signal is divided into 25 30 s frames, each having 1500 bits and these are divided into five 6 s subframes. Each 6 s subframe is divided into ten 30 bit words. All the information necessary for a position fix (ephemeris etc) is contained within each frame and so a GPS receiver will typically take around 30 s to produce a position fix from a so-called cold start. This is often called "time to first fix" (TTFF).

The first subframe gives clock correction data, the second and third subframes give ephemeris data and the almanac data is in the fourth and fifth subframes.

The SVs all broadcast on the same frequency. In order to distinguish a signal from a particular satellite, the receiver needs to generate a replica of the C/A code known to be in use by that satellite and align it so that it is synchronised with the incoming signal which will be delayed by an unknown amount predominantly due to the time of flight of the signal in travelling from the satellite to the receiver (typically around 0.07 s). In general, it is not possible for a receiver to accurately predict the alignment necessary to get the replica in sync with the incoming signal, so some form of search is required, with a number of alignments being tried in turn and the best match being selected. This process of evaluating a number of candidate alignments is normally termed correlation as the receiver implements a correlation function between the received signal and the known C/A code for each satellite in turn, to determine if the received signal includes a component having the C/A code from a particular SV. The correlation function has to be calculated for multiple relative timings, and when the correlation peak is found, this corresponds to a particular timing and a particular SV. The discovered timing in turn corresponds to a particular distance from the SV.

The search for each satellite C/A code is complicated by the fact that the apparent frequency of the satellite signal observed by the receiver will vary. The principal sources of variation are the Doppler-effect due to the movement of the satellite; Doppler-effect due to movement of the receiver; and the drift and offset of the local oscillator (LO) unit within the receiver's frequency synthesizer. This means that an exhaustive search for the C/A code requires the evaluation of the correlation function at a range of phase (temporal) shifts for each of a range of frequency shifts.

The correlation process is sometimes referred to as "despreading", since it removes the spreading code from the signal. The determined code-phase—that is, the timing of the peak of the correlation function—reveals the accurate timing information for use in the distance calculation. However, as the code is repeated every millisecond, the coarse timing also needs to be determined. Typically, less frequently repeating data components are used for the more coarse timing evaluation (i.e. to enable GPS time to be derived), such as the individual bits of the 50 bps data message and specific parts of it such as the subframe preamble or subframe handover word.

Together, the code-phase and coarse timing information comprise a "pseudo-range", because they identify the time-of-flight of the message from the satellite. This time-of-flight is related to the distance travelled by c, the speed of light. This is a "pseudo"-range or relative range (rather than a true range) because the relative offset between the satellite's clock and the receiver's RTC is unknown. However, this offset is the same relative to all satellites (since their clocks are synchronized); so, pseudo-ranges for a set of diverse satellites provide sufficient information for the trilateration calculation to determine a unique position fix.

The majority of GPS receivers work by processing signals from the satellites in "real time", as they are received, reporting the position of the device at the current time. Such "conventional" GPS receivers invariably comprise:

an antenna suitable for receiving the GPS signals, analogue RF circuitry (often called a GPS front end) designed to amplify, filter, and mix down to an intermediate frequency (IF) the desired signals so they can be passed through an appropriate analogue-to-digital (A/D) converter at a sample rate normally of the order of a few MHz, digital signal processing (DSP) hardware that carries out the correlation process on the IF data samples generated by the ND converter, normally combined with some form of micro controller that carries out the "higher level" processing necessary to control the signal processing hardware and calculate the desired position fixes.

The less well known concept of "Store and Process Later" (also known, and hereinafter referred to, as "Capture-and-Process") has also been investigated. This involves storing the IF data samples collected by a conventional antenna and analogue RF circuitry in some form of memory before processing them at some later time (seconds, minutes, hours or even days) and often at some other location, where processing resources are greater and the receiver is not powered by a battery.

This means that a Capture-and-Process receiver is considerably simpler than a real-time receiver. Only short segments of samples need to be stored—for example, 100-200 ms worth of data. There is no longer any need to decode the (very slow) data message from each SV; no need to perform correlation and determine pseudo-ranges; and no need to execute the trilateration calculation to derive a position fix. Accordingly, much of the digital signal processing hardware of the conventional receiver can be eliminated, reducing complexity and cost. Power consumption is also significantly reduced, leading to longer battery life.

Other Capture-and-Process receivers have also been proposed which include the DSP hardware necessary for calculating position fixes. In one mode, such a device receives, samples and stores GPS signals in a memory, but does not process them. When switched to a separate mode, the device ceases receiving signals and instead starts processing those samples which were stored previously. A device of this kind is suitable for generating a retrospective track-log, or history of movements, for example after the user has returned from a trip.

According to a first aspect of the present invention, there is provided a satellite positioning receiver comprising:

an RF front end, for receiving satellite positioning signals;

an analogue-to-digital converter, for sampling the received signals to generate signal samples;

a memory; and a processor, for processing the signal samples to derive ranging measurements and to calculate a position fix, the receiver having a first mode in which the processor is operable:

to process a first set of the samples as they are generated, to calculate a first position fix; and to store in the memory information associated with this calculation, the receiver having a second mode in which it is operable to store a second set of the samples, or ranging measurements derived from the second set of samples, in the memory for later processing to calculate a second position fix, the receiver having a third mode in which the processor is operable:

to retrieve the stored second set of samples or ranging measurements from the memory; and to process them to calculate the second position fix, wherein said processing is assisted by the information associated with the calculation of the first position fix.

This is a hybrid receiver, which combines advantages of a real-time receiver with those of a Capture-and-Process receiver. Unlike known receivers, it offers the benefits of Capture-and-Process technology combined with the ability to also support real-time navigation. The present inventors have recognised that, contrary to the conventional wisdom, there are certain applications in which it is advantageous for a single receiver to behave as either a Capture-and-Process receiver or as a real-time receiver, depending upon the circumstances. For example, in a Capture-and-Process track-log device of the type sometimes used in outdoor recreation, it may be very useful to calculate a "live" position fix in an emergency. Conversely, for a real-time receiver, it may be useful to function in Capture-and-Process mode temporarily—for example, for a period soon after start-up, before real-time positioning functions have been initialised.

The receiver according to the first aspect of the invention provides an intelligent strategy for calculating the second position fix. By exploiting information already available about the first position fix, the calculation of the second position fix can be made more effective or efficient. That is, information about a (first) position fix calculated in real time is used to facilitate the processing of another (second) position fix, calculated off-line. For example, the second position fix may be calculated more quickly or with less computational effort. Conversely, more accurate or reliable results for the second position fix may be provided, without increase in the computational burden.

In the first mode, typically, neither the samples nor the ranging measurements (such as code-phases or pseudo-ranges) are stored in the memory. That is, the samples are processed to calculate a position fix immediately, without being stored in the memory.

The operations in the first mode may be performed either before or after the operations in the second mode. In particular, the first set of samples may be received before or after the second set of samples. (That is, the words "first" and "second", in this context, should not be understood to imply any order or precedence). Note, however, that the calculation of the second position fix necessarily occurs after the calculation of the first position fix, because of the causal relationship between them (since the information associated with the calculation of the first position fix must be available in order to assist the calculation of the second position fix).

A ranging measurement may comprise, for example, a code-phase, carrier-phase, or pseudo-range measurement. In general a ranging measurement is a value which (implicitly or explicitly) provides some information about a distance from the satellite positioning receiver to one satellite among the constellation of positioning-satellites. A ranging measurement may be a represented by a distance or by a time-of-flight or time-of-arrival of a signal. Many types of ranging measurements are not absolute or unique measurements—they typically incorporate some degree of relativity or ambiguity. For example a code-phase measurement, by itself, specifies (relative) time-of-arrival by reference only to a single bit-period (that is, within one complete repetition of the spreading code). There remains an ambiguity about which bit-period of the satellite data message is being observed. The term "ranging measurement" should therefore be understood to include both measurements including some degree of ambiguity as well as absolute and/or unique distance measurements.

The information associated with the calculation of the first position fix may be information that was derived in the process of calculating the first position fix (that is, an output or intermediate result), or information that was used in the course of calculating the first position fix (for example, input data; or external reference data, other than intermediate results).

The first mode may be selected in response to connection of the receiver to an external power supply. This provides a hybrid receiver that produces position fixes in real-time when connected to an external power source (such as a car battery), but which stores samples (or ranging measurements) when running on internal battery power. The stored samples or intermediate measurements are suitable for retrospective calculation of position fix if and when desired. This allows the device to function in a first, high-power, real-time navigation mode when connected to a plentiful energy supply but to operate in a second, low-power, off-line track-log mode when running on its own battery. Indeed, the second mode may correspond to a standby condition—when real-time navigation functions are not required and the device is intended to be consuming minimal power. Battery life may be extended by automatic switching between the modes.

The information associated with the calculation of the first position fix that is used to assist the calculation of the second position fix may comprise knowledge of one or more of: the first position; a velocity associated with the first position; a time at which the first set of samples was received; a time-difference between the time of receiving the first set of samples and the time of receiving the second set of samples; a list of one or more satellites whose signals were detected in the first set of samples; a detected carrier frequency of such a satellite; a detected Doppler shift of such a carrier frequency; a ranging measurement derived from the first set of samples; a differential correction applied to such a ranging measurement; ephemeris data used in the calculation of the first position fix; a portion of a data message transmitted by a satellite; satellite-health information; satellite clock correction data; and an uncertainty parameter associated with any of the foregoing.

The processor is preferably adapted to store in the memory one or more of these pieces of data. The uncertainty parameter expresses a confidence or degree of uncertainty in the information with which it is associated. Such an uncertainty could be expressed, for example, as an expected value of numerical error (such as "±25 m", for a position parameter) or as a probability estimate.

The receiver (or a part of the receiver—for example, the processor) is preferably adapted to store in the memory a time-stamp associated with the receipt of the first set of samples, the second set of samples, or both.

This facilitates extrapolation (prediction) of various parameters from the first position calculation to the second position calculation, based on knowledge of how those parameters have changed over time.

The processor is preferably adapted to measure an elapsed time between receiving the first set of samples and receiving the second set of samples.

That is, a record is kept of the difference between the time of arrival of the satellite signals which give rise to the first set of samples and the time of arrival of the satellite signals which give rise to the second set of samples. It may be possible to measure this difference more accurately than it would be to calculate the difference by subtracting respective time-stamps. For example, the difference may be measured by counting periods of an oscillator signal generated at the receiver, such as a high-quality, high-frequency oscillator signal, or by counting periods of the carrier in the satellite signal. This may be done by observing and counting the number of rising or/and falling edges of a periodic signal, in order to improve precision. Preferably this counting technique is applied to the oscillator signal produced by a frequency synthesizer which generates the high-frequency clock signal for the analogue-to-digital conversion and the subsequent digital processing. This allows the measurement of elapsed time to benefit from the granularity of a high-frequency oscillator.

The calculation of the second position fix may be assisted by one or both of: predicting ephemeris data suitable for calculating the second position fix based on ephemeris data used to calculate the first position fix; and predicting a code phase of the spreading code for one or more satellites in the second set of signal samples, based on at least one code phase that was determined in the process of calculating the first position fix.

The receiver of any preceding claim, wherein the processor is further operable: to process a third set of the samples as they are generated, to calculate a third position fix; and to store the third position fix in the memory, wherein, in the third mode, when processing the retrieved second set of samples to calculate the second position fix, the processing is assisted by information associated with the calculation of the first position fix and information associated with the calculation of the third position fix.

The calculation of the second position fix may be assisted by linear or non-linear prediction of the value of at least one parameter, based on values of that parameter that are associated with the first and third positions.

If the first set of samples was generated before the second set of samples and the third set of samples was generated after the second set of samples, this may comprise interpolating (in a linear or non-linear fashion) between the information associated with the first and third position fixes.

The at least one parameter to be predicted may be, for example, a position coordinate; a time (such as an estimate of a satellite-clock time); a clock-error of the receiver or a drift-rate of such a clock-error; a ranging measurement; or a Doppler shift of a carrier-frequency.

The receiver is preferably further adapted to enter the first mode periodically, and in that mode to process a set of samples as they are generated, to calculate a position fix; and to store in the memory information associated with this calculation.

In this way, the receiver deliberately enters the first mode, occasionally, to ensure that information is available to assist subsequent (offline) processing in the second mode.

For example, this approach could be used to ensure that fresh ephemeris is downloaded at regular intervals.

Alternatively or in addition, the selection of the first or second mode of operation may depend on the functions activated by the user. For example, the use of real-time navigation functions would require the device to operate in the first mode.

According to a second aspect of the invention, there is provided a satellite positioning receiver comprising:
  an RF front end, for receiving satellite positioning signals;
  an analogue-to-digital converter, for sampling the received signals to generate signal samples;
  a memory; and
  a processor, for processing the signal samples to derive ranging measurements and to calculate a position fix, the receiver having a first mode in which the processor is operable:
  to process a first set of the samples as they are generated, to calculate a first position fix; and
  to store in the memory information associated with this calculation;
the receiver having a second mode in which it is operable to store a second set of the samples, or ranging measurements derived from the second set of samples, in the memory for later processing to calculate a second position fix,
wherein the receiver is adapted to upload the information and the second set of samples or ranging measurements stored in the memory to an external device, by which external device the second set of samples or ranging measurements can be processed to calculate the second position fix, said processing being assisted by the information associated with the calculation of the first position fix.

In the second mode, the processor may be operable to store the second set of the samples in the memory. Alternatively, in some embodiments, the samples may be stored in the memory directly (for example, by the A/D converter), thereby bypassing the processor.

The receiver according to this aspect of the invention is similar to the first aspect described above, and provides similar advantages. It differs from the receiver of the first aspect in that the second position fix is not calculated by the receiver itself—instead, the data to be used for calculating the second position fix is uploaded to an external device.

The external device may be, for example, a general purpose personal computer or server computer, or another electronic device.

The processor may be adapted: to store in the memory a time-stamp associated with the receipt of the first set of samples, the second set of samples, or both; and to upload said time-stamp or time-stamps to the external device.

The receiver/processor/clock may be adapted to measure an elapsed time between receiving the first set of samples and receiving the second set of samples.

According to a third aspect of the invention, there is provided a method of calculating a position fix from previously stored satellite signal samples, the method comprising:
  receiving from a satellite positioning receiver:
    information associated with the calculation of a first position fix calculated by the receiver from a first set of satellite signal samples; and
    a second set of satellite signal samples, or ranging measurements derived from a second set of satellite signal samples, and
  processing the second set of samples or the ranging measurements to calculate a second position fix,
wherein said processing is assisted by the information associated with the calculation of the first position fix.

The method according to the third aspect of the invention is suitable for processing the data uploaded by a device according to the second aspect, described above. That is, the method is suitable to be performed by an external device receiving the data from the receiver.

The information associated with the calculation of the first position fix that is used to assist the calculation of the second position fix may comprise knowledge of one or more of the items listed previously above.

The method may further comprise receiving one of these pieces of data (or any combination consisting of more than one piece thereof) from the satellite positioning receiver.

The method may further comprise receiving from the satellite positioning receiver a time-stamp associated with the receipt of the first set of samples, the second set of samples, or both.

The method may further comprise receiving from the satellite positioning receiver a measurement of an elapsed time between the time at which the receiver received the first set of samples and the time at which it received the second set of samples The assisted processing may comprise predicting ephemeris data suitable for calculating the second position fix based on the ephemeris data used to calculate the first position fix.

The calculation of the second position fix may be assisted by: predicting a code phase of the spreading code for one or more satellites in the second set of signal samples, based on at least one code phase that was determined during the calculation of the first position fix. The method may further comprise receiving from the satellite positioning receiver the at least one code-phase determined in the calculation of the first position fix.

According to a fourth aspect of the invention, there is provided a method of calculating two position fixes, using satellite positioning, the method comprising:
  using an RF front-end, receiving satellite positioning signals;
  using an analogue-to-digital converter, sampling the received signals to generate signal samples;
  using a processor, processing a first set of the samples as they are generated, to calculate a first position fix;
  storing information associated with the calculation in a memory;
  storing a second set of the samples, or ranging measurements derived from the second set of samples, in the memory for later processing to calculate a second position fix; and
  later, processing the second set of samples to calculate the second position fix, wherein the calculation of the second position fix is assisted by the information associated with the calculation of the first position fix.

This method may be performed in full by a receiver according the first aspect of the invention. Alternatively, it may be performed by separate, distributed devices, such as the receiver according to the second aspect of the invention working in cooperation with an external device, as discussed earlier above.

Also provided is a computer program comprising computer program code means adapted to perform all the steps of any of claims 11 to 13 when said program is run on a computer; and such a computer program embodied on a computer readable medium.

The invention will now be described by way of example with reference to the accompanying drawings, in which.

Figure 1:
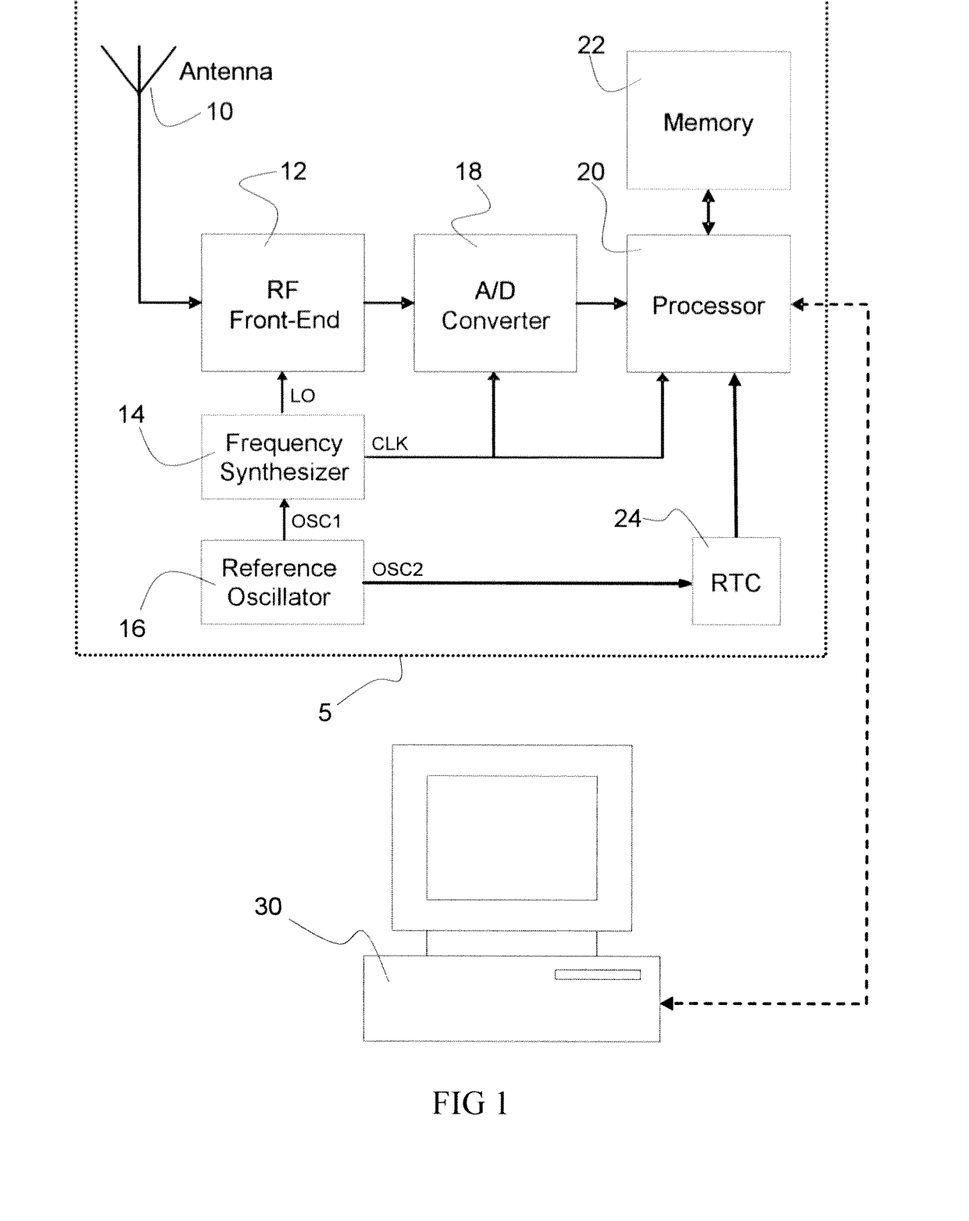
FIG. 1 is a block diagram showing a GPS receiver according to an embodiment of the invention.

FIG. 1 shows a GPS receiver suitable for operating in accordance with embodiments of the invention. The GPS receiver 5 comprises an antenna 10 coupled to an RF front-end 12. The RF front-end 12 includes circuitry for amplifying GPS signals received via the antenna 10. It also includes filtering circuits for attenuating out-of-band interference; and a mixer. The mixer multiplies the received signals with a local oscillator (LO) signal that is produced by a frequency synthesizer 14, to generate signals at sum and difference frequencies. Frequency synthesizer 14 is driven by a high-frequency output OSC1 produced by a reference oscillator 16. In the present embodiment, the high-frequency output OSC1 of the reference oscillator 16 operates at a frequency of 26 MHz. After further appropriate filtering, the mixing operation in the RF front-end 12 yields an intermediate frequency (IF) signal that is input to analogue-to-digital (A/D) converter 18. The signal samples generated by the A/D converter 18 are output to processor 20 for processing. Both A/D converter 18 and processor 20 are clocked by a high-speed clock output CLK generated by the frequency synthesizer 14. Note that the analogue circuits of the RF front-end 12 and the A/D converter 18 may be of conventional types, such as will be well known to the skilled person.

The processor 20 provides two modes for processing the signal samples received from the A/D converter 18. In the first mode, the processor operates to process the samples immediately as the signals are received and sampled. This processing comprises deriving pseudo-ranges and calculating a position fix. This mode is therefore suitable for real-time navigation, since a live position fix is provided. In the second mode, the processor is instead operable to store data in a memory 22 without completing the processing. In the presently described embodiments, the data stored in the memory 22 comprises the raw samples of IF signals provided by the A/D converter 18. However, in other embodiments it may comprise partially processed data, such as pseudo-ranges or other ranging measurements.

A real-time clock (RTC) 24 is also provided to keep track of the current time and can be used to produce time-stamps which are associated with the data stored in the memory 22. This allows later determination of the approximate time at which the data was stored. RTC 24 is driven by a second output OSC2 produced by the reference oscillator 16. However, since the RTC 24 runs at a slower rate than that required of the frequency synthesizer 14, a frequency divider is used within the reference oscillator 16 to provide the low-frequency output OSC2. In this way, the reference oscillator 16 acts as a master oscillator generating a master clock signal from a single quartz crystal, to which both the frequency synthesizer 14 and the RTC 24 are synchronised. In the present embodiment, the low-frequency output OSC2 of the reference oscillator 16 operates at a frequency of approximately 26 kHz, which implies a frequency divider ratio of around one thousand.

Note that the processor 20 may be implemented as a bespoke hardware device, such as one or more application specific integrated circuits (ASICs). Alternatively, the processor may comprise one or more general purpose processing units or digital signal processors (DSPs) which have been suitably programmed. Implementation of either alternative will be well within the capabilities of those skilled in the art.

The GPS receiver 5 is connectable to a personal computer 30 via a communications link. This link may be wired (for example, USB) or wireless (for example, Bluetooth or WLAN). In some embodiments, part of the processing of satellite signals may be performed at the personal computer. This will be explained in greater detail in the examples below.

A first embodiment of the invention will now be described, with reference to FIG. 2.

In step 100, the GPS receiver 5 receives GPS signals. These signals are digitised 110 in real-time by the A/D converter 18 to generate GPS signal samples. The processor, operating in the first mode, processes 120 a first set of samples in real-time, to calculate a position fix. Information about this calculation is stored 130 in the memory 22.

At some point in time, the receiver 5 then switches to the second mode. In this mode, a second set of samples is stored 140 in the memory 22, for later, offline processing.

According to the first embodiment, in addition to its first and second modes, the processor 20 has a third mode. In this mode, it is adapted to retrieve the stored second set of samples from the memory 22. The processor also retrieves from the memory 22 the stored information about the calculation of the first position fix. The processor 20 processes 150 the retrieved set of samples to calculate a second position fix. This processing 150 is assisted by the information associated with the calculation of the first position fix, which has also been retrieved from the memory. The assisted processing and the information which supports it will be described in greater detail below.

Figure 2:
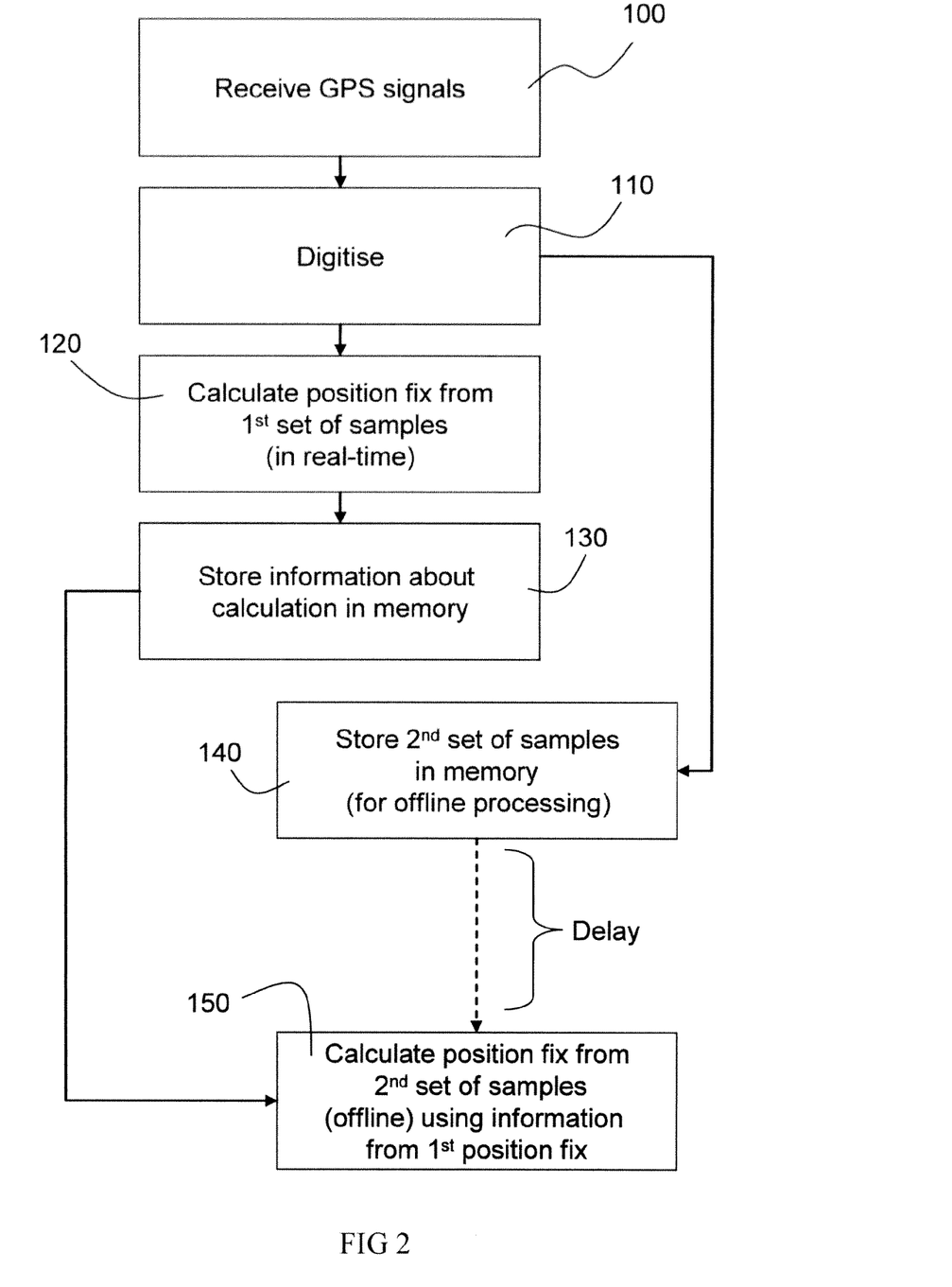
FIG. 2 is a flowchart of a method for the GPS receiver, according to a first embodiment of the invention.

In the example of FIG. 2, the processor enters the third mode at some time after the second mode. Thus, there is a delay between the step 140 of storing samples, in the second mode, and the step 150 of processing those samples, in the third mode.

Figure 3:
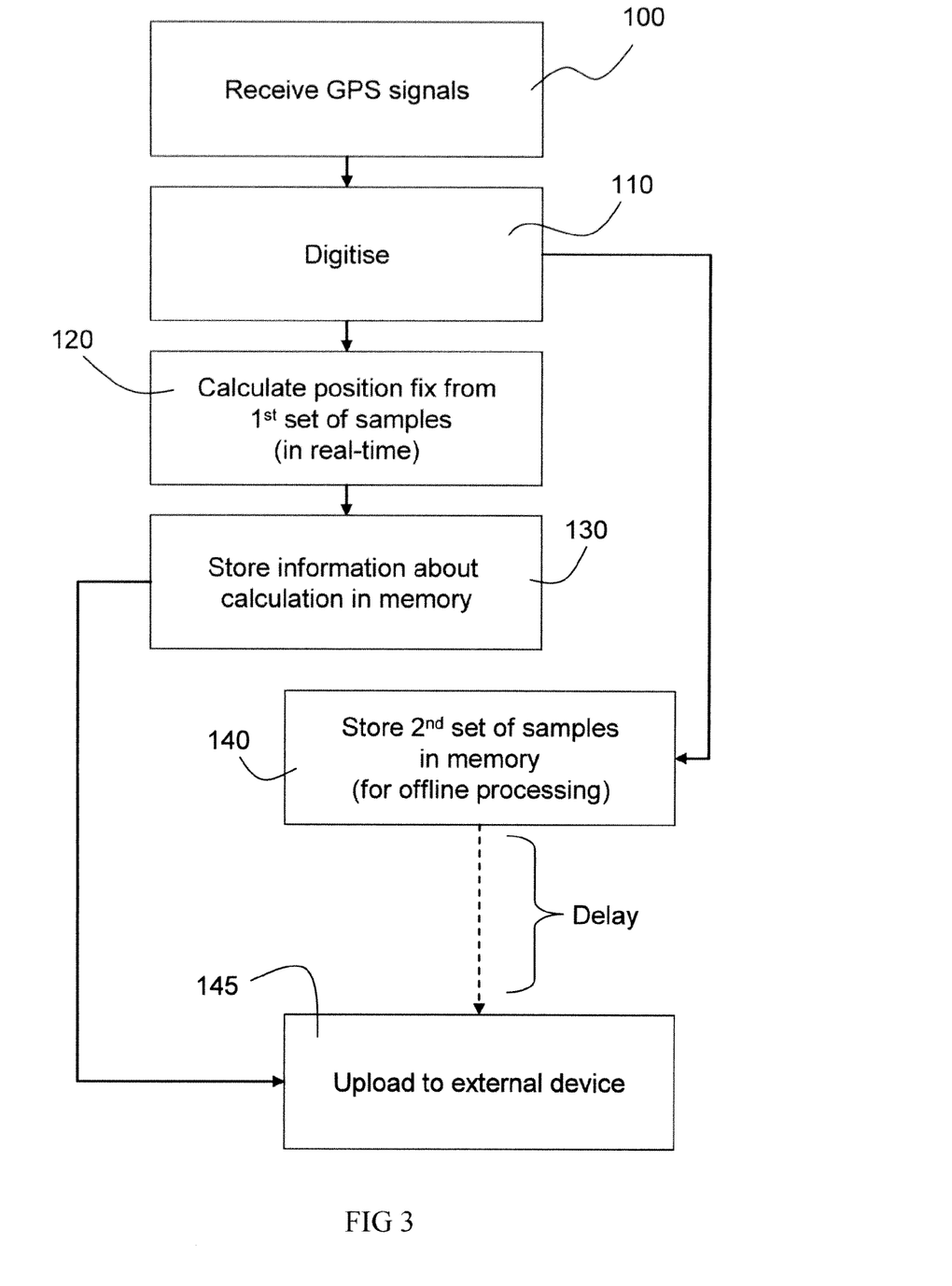
FIG. 3 is a flowchart of a method for the GPS receiver, according to a second embodiment.

A second embodiment of the invention will now be described, with reference to FIG. 3. This embodiment is similar to the first, and the initial steps are the same. The second embodiment differs in that, instead of performing processing step 150, the receiver uploads 145 the stored second set of samples and stored information relating to the calculation of the first position fix to an external computing device 30. The processing of the second set of samples to calculate a second position fix will then be performed by the external device 30.

Figure 4:
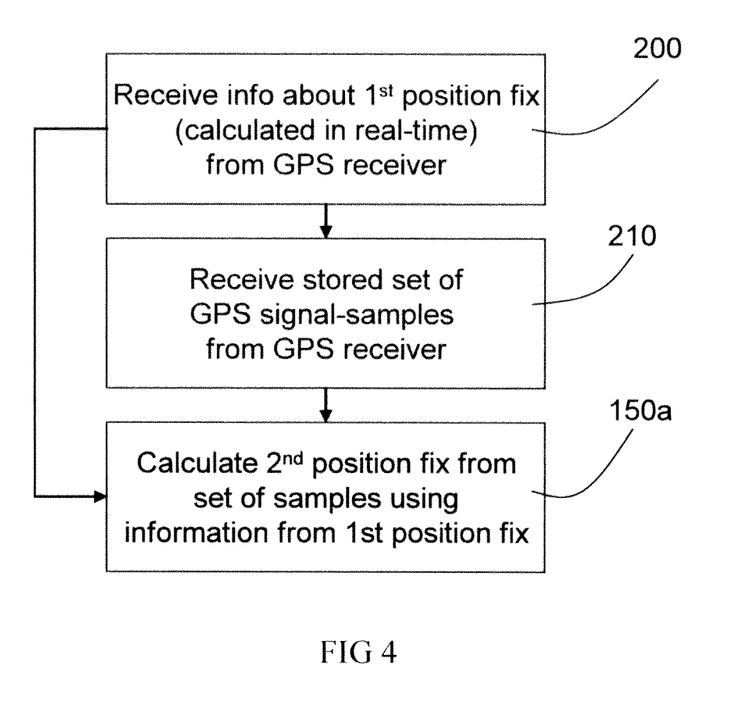
FIG. 4 is a flowchart of a method performed by a device external to the GPS receiver, according to the second embodiment.

The method executed by the external device 30 is illustrated in FIG. 4. In step 200, the device 30 receives information relating to the calculation of the first position fix from the GPS receiver 5. Next, the device 30 receives 210 the (second) set of GPS signal samples that were stored earlier by the receiver 5. Finally, in step 150*a*, the external device 30 processes the uploaded set of GPS signal samples to calculate a second position fix. This processing 150*a* exploits the information about the first position fix to assist the calculation of the second position fix.

In both embodiments, the information about the first position fix that is used in the calculation of the second position fix can be of a variety of types. Likewise, the way that this information assists the processing can vary. Some examples will now be described.

EXAMPLE 1

In this example, the information about the first position fix comprises knowledge of the first position itself—that is, the coordinates of the first position calculated in real-time. This position can be used to estimate the second position. Having an initial estimate of position allows the likely visible satellites (known as "Space Vehicles", SVs) to be predicted. Consequently, in the despreading process, the searching can be made more efficient. For example, it can be assumed that the same set of SVs will be visible (that is, detectable in the second set of signal samples); thus, the correlation operation can prioritise the PN codes for these SVs.

If the position of the first fix is available, satellite trajectory data (such as ephemeris) can be used to determine the satellites that would have been visible from the first position, at the time that the first set of signal samples was generated. Thus, the time of the first position fix should also be known (or estimated).

Alternatively, a similar result can be achieved by explicitly storing the list of satellites detected in the first set of signal samples. In this way, even without knowing the time of the first position fix, the list can be used to guide the correlation-search.

EXAMPLE 2

In this example, the information about the first position fix comprises a time stamp of the first position fix—that is, a record of the time at which the first set of signal samples was generated. This may be used together with a time-stamp of the second set of samples; or an elapsed time (time-difference) measured between the capture of the first and second sets of samples.

This allows estimation of the time corresponding to the capture of the second set of signal samples—either absolutely, or relative to the time of capture of the first set of samples.

In the process of calculating the first position fix, the precise (satellite-clock) time corresponding to the first position will be determined. Once determined, it is not a significant additional burden to store this information in the memory 22. If the time of capture of the second set of signal samples is also recorded, a time difference can be calculated. Alternatively, the length of time that has elapsed since the first position fix can be measured directly when the second set of samples is captured.

WO 2009/000842 has previously disclosed how the relative timings of separately captured sets of IF data samples can be used to boost efficiency when processing all the sets together. This can also be applied to the relative timing of the first (real-time) position fix and the second (stored) set of samples.

Using the known time and position of the first position fix as a reference, the satellite-clock time (Coordinated Universal Time, UTC) of the second set of samples can be predicted. This, in turn, allows a variety of parameters to be predicted which are helpful in the calculation of the second position fix:

The set of visible satellites can be predicted.

The bit-position in the satellite data message can be predicted. This eliminates the ambiguity in a code-phase measurement, meaning that a unique pseudo-range can be immediately inferred from the code-phase measurement In this case, information about a bit-position in the first set of samples is preferably stored in the memory at the time that the first position fix is calculated. This information is used together with the time difference, to predict the bit-alignment in the second set of samples.

Where the second set of samples and the real-time fix are reasonably close to each other (typically within a few minutes, depending on the quality of the receiver real-time clock 24 and/or reference oscillator 16), the time information may even be accurate enough to allow code phase prediction, thus reducing search effort and raising sensitivity. In this case, information about the code-phase of the first set of samples should be stored in the memory. This information is used together with the time difference, to predict the code-phase of the second-set of samples. This may be done for each satellite individually.

Furthermore, parameters such as the amount of Doppler shift (or equivalently, observed carrier frequency) are likely to change slowly over time and will therefore typically be correlated among sets of samples captured over reasonably short time intervals. (Note that Doppler shift is typically dominated by satellite motion and receiver LO offset, both of which are slowly varying). This insight can be used to better prioritise the correlation search strategy in the frequency dimension as well as phase-shift. In this case, the carrier frequency and/or Doppler shift observed in the first set of samples should be stored in the memory 22. This information is used together with the time difference information, to predict the carrier-frequency (or respectively, Doppler shift) of the second set of samples. Again, this may be done for each satellite signal separately.

The second set of samples can be annotated with a simple elapsed time counter rather than a full date/time, because the absolute UTC date/time can be deduced from the first, real-time fix. For more accurate time-offset measurement, the receiver could count the number of periods of the carrier wave from one or more satellites between the first and second sets of samples. A similar approach to this is used in carrier-phase navigation, which is known to those skilled in the art. Greater accuracy may be possible by counting half-periods—for example, by counting both rising and falling edges.

EXAMPLE 3

In this example, the information associated with the first position fix comprises satellite trajectory data. In order to calculate the first position fix, the receiver 5 must have had access to satellite ephemeris data. This may have been decoded from the satellite data messages, or downloaded from another source—as in an Assisted GPS (A-GPS) system. Rather than derive ephemeris information a second time, the ephemerides obtained by the real-time operation can be reused. If the ephemerides are within their normal period of validity, they may be used directly. If they are outside their normal period of validity, orbit prediction techniques can be used to extrapolate SV movements into the past or future. Such techniques use a celestial mechanical model to predict the dynamics of the satellites.

The different types of information used in these different examples can advantageously be used in combination. For instance, the use of position (as in the first example) can beneficially be combined with the use of time (as in the second example) to provide better assistance. Based on the first position, and the elapsed time, a locus of possible positions of the device can be estimated. Knowledge of speed and direction of travel can be used to estimate the position at the time that the second set of samples was generated. Alternatively, if speed of travel cannot be measured, a speed could be assumed based on knowledge of the application for which the GPS receiver is intended. For example, if the GPS receiver is designed as a bicycle accessory, then one set of assumptions can be made; if the GPS receiver is designed as an in-car navigation device (or is a Portable Navigation Device that is being powered by a cigarette lighter socket in a car) then a higher speed may be assumed. The better the approximate estimate of time and position, the greater the likely efficiency improvement when processing of the second set of samples. The information can be used to choose the starting-point and search-range for the code-phase search more accurately, for example.

In all cases, it is important to note that because the processing for the second position calculation happens later, the aiding can be both forwards in time (using a previous real-time position fix) and backwards in time (using a subsequent real-time position fix). Furthermore, in many cases, the aiding can be achieved even more accurately and effectively by interpolating between real-time data either side of the stored samples in question, rather than simply extrapolating from a single observation.

Here, interpolation means that a third set of samples has been generated and processed to calculate a third position fix in real-time. Thus, there is available a first position fix, resulting from real-time processing of a first set of samples; and a third position fix, resulting from real-time processing of a third set of samples. These will be used to assist the calculation of the second position fix, from the second set of samples. Preferably, one of the first and third fixes should be earlier in time than the second set of samples, with the other of the first and third fixes being later in time. However, prediction from two position fixes is also useful if both are earlier in time than the second set of samples, or if both are later in time. Nevertheless, for simplicity in the following examples, we will refer to "interpolation" in the sense of one real-time fix to each side (on the time axis) of the second set of samples.

Various parameters from both real-time fixes can then be used to aid the processing of the second set of samples These include (but are not limited to):

Position of the receiver (that is, the first and third position fixes). This may preferably be expressed as x, y, z Cartesian coordinates in some reference frame, but could also be expressed as latitude, longitude, and altitude.

Clock error (the apparent discrepancy between time as measured by the receiver real-time clock 24 and GPS time, as determined by the synchronised satellite clocks)

When only a single real-time fix is used for prediction, these parameters could have moved in any direction. The longer the time difference between the real-time fix and the generation of the second set of samples, the greater the allowance that must be made (up to some upper limit—for example, the size of the Earth, for deviation in position).

The limit of clock error (for example) for the second set of samples might be expressed as:

$$\text{ClkErr}R+/-(\text{MaxClkErrRate}*(TC-TR))$$

(where ClkErrR is the clock error measured at the real-time fix at time TR, the capture was recorded at time TC and MaxClkErrRate is the maximum rate of change of clock error—usually defined by the specification of the crystal oscillator part used in the reference oscillator 16 of the receiver and measured in parts per million.)

If a real-time fix is available at both sides of the second set of samples then there are several possible refinements:

1) The limits for the parameters in question are constrained by both of the real-time measurements. Thus, for example, the maximum clock error is: the minimum of:

$$\text{ClkErr}R1+(\text{MaxClkErrRate}*(TC-TR1)), \text{ and}$$

$$\text{ClkErr}R2+(\text{MaxClkErrRate}*(TR2-TC))$$

The minimum clock error would be the maximum of:

$$\text{ClkErr}R1-(\text{MaxClkErrRate}*(TC-TR1)), \text{ and}$$

$$\text{ClkErr}R2-(\text{MaxClkErrRate}*(TR2-TC))$$

(if TR1 comes before TC and TR2 is after).

2) The correlation-search can be centred on a linear interpolation between ClkErrR1 and ClkErrR2 (in proportion to TR1, TC and TR2).

3) Where the two real-time values are quite close together (as they commonly will be) the value of MaxClkErrRate might even be reduced, because the chance of a major excursion in clock error before returning back where it came from is highly unlikely.

The effect of each of these refinements is to reduce the search range for code-phase during despreading (in many cases quite substantially), as well as providing a better centre value (that is, initial estimate). This is likely to improve success rates as well as reducing computational cost.

The interpolation may also include terms for measurement error—for example the measured clock errors ClkErrR1 and ClkErrR2, above, may be uncertain. The rate at which uncertainty grows may also be modelled in a more sophisticated (for example non-linear) manner. It may also be desirable to incorporate knowledge (from the real-time fixes) of receiver velocity and clock drift (that is, the rate of change of clock error).

The embodiments described above depend on the GPS receiver 5 being in the first mode (real-time positioning) for some of the time and the second mode (Capture-and-Process) at other times. This may depend on the usage of the device: for example, real-time activity may be initiated by the user when he/she needs to use real-time navigation functions. Alternatively, it may be helpful for the receiver 4 to periodically enter the first mode and perform at least one real-time position fix, deliberately for the purpose of aiding subsequent offline processing of intervening, stored sets of signal samples. This could ensure, for example, that some ephemeris is downloaded every few hours (or even days if using orbital prediction to extend the period of validity), or that a position fix is attempted occasionally.

In the embodiments described above, a second set of samples is stored in a "raw" form—in particular, as sampled intermediate frequency (IF) signals. That is, the samples are stored directly after digitisation, without further processing. In other embodiments of the invention, the second set of samples may be processed in real-time to derive intermediate data, such as ranging measurements. These ranging measurements may then be stored. One advantage of this is that the volume of data stored is typically less. However, it requires greater computational effort (and hence power consumption) in the second mode.

If ranging measurements are stored, embodiments of the invention can still be used to aid the calculation of a position fix from them. In this case, the information associated with the first (real-time) position fix that is used to aid the calculation of the second position fix would typically be satellite trajectory data, such as ephemeris, along with time-stamps or time-differences, as described earlier above. For example, if the stored ranging measurements comprise pseudoranges, the stored satellite trajectory information relating to the first position fix can be used (together with knowledge of the relative times) to calculate a position fix.

In addition to trajectory data, information about satellite-health and/or clock correction can assist in the calculation of the second position. If the stored ranging measurements comprise code-phases only (rather than full pseudoranges) additional information may be useful. In particular, it is helpful to have a copy of the data bit-patterns transmitted by each SV around the time of the second set of samples. If such information is available the stored sequence of signal samples can be compared with the known bit-sequence, to establish the position in the data message and hence resolve the ambiguity in the code-phase. Note however that such a copy of the data message for a different time will not usually be available from the calculation of the first position fix—it should be obtained by other means. WO 2009/000842 discloses how a complete copy of the data messages transmitted by all satellites can be used to allow pseudo-ranges and position fixes to be calculated from captures (sets of samples) of shorter duration than would otherwise be possible.

As a further example, Differential GPS (D-GPS) systems are known in the art, in which corrections are applied in order to increase the accuracy of positioning. One common way of applying the corrections is to correct the ranging measurements made from the received GPS signals. This is because a significant source of positioning error is due to ionospheric and tropospheric distortions. These result in errors in the ranging measurements because they distort the relationship between time-of-flight of the radio waves and the distance travelled. These errors are relatively stable over moderate periods of time and distances. Therefore, if the receiver 5 uses DGPS corrections in its real-time position calculations, it may be advantageous for the corrections to be stored in the memory 22. The same corrections can then be applied when the second set of signal samples (or ranging measurements derived from the samples) are processed to calculate the second position fix. The corrections will be helpful to the extent that the receiver is in approximately the same area and the atmospheric propagation conditions have not changed significantly.

While the invention has been illustrated and described in detail in the drawings and foregoing description, such illustration and description are to be considered illustrative or exemplary and not restrictive; the invention is not limited to the disclosed embodiments.

Notably, in some embodiments, instead of measuring and storing full pseudo-ranges, the receiver may store code-phases. This avoids the additional processing needed to establish the coarse timing (position in the data message). However, in this case, supplementary information will be needed when the code-phases are later processed, to allow the coarse timing ambiguity to be resolved. Typically, therefore, some other information will need to be stored along with the code-phases or obtained separately.

The coarse timing can be determined in a wide variety of ways, and so the type of data which should be stored to augment the code-phases can also vary widely. Ultimately, what is needed is an approximate estimate of the time-instant to which the code-phase measurement corresponds and some way to relate this estimate to the satellite clock. This then enables the position in the data message to be determined. Approximate times could be determined from an internal real-time clock of the receiver, provided the relationship between this real-time clock and the satellite clock can be established accurately enough to resolve the ambiguity. Thus, in one example, time-stamps generated by the internal real-time clock can be stored to supplement measured code-phases. The relationship with the satellite clock could be established by intermittently storing a block of signal samples that is long enough to extract satellite clock information (also with a local time-stamp). Alternative ways of determining the coarse timing will be apparent to those skilled in the art. For example, it would be possible to use a coarse estimate of position (at the time the code-phases were measured) to extrapolate the coarse timing (because the timing is uniquely related to the relative positions of the satellites with respect to the receiver at every time instant). A coarse position estimate might be available from some external source, or could, for example, be calculated from the observed Doppler shifts of the satellite constellation. In this way, storing the apparent (observed) satellite broadcast frequencies could also be a suitable supplement for stored code-phases.

WO 2006/018803 describes one efficient and effective way of storing time-stamps together with signal samples: a small portion of the GPS signal samples can simply be over-written (replaced) in the memory by the time-stamp bits. This not only avoids the need for separate records of time-stamp but also ensures accurate synchronisation of the time-stamp against the received samples. The small, missing part of the captured set of samples does not usually degrade the subsequent processing steps.

The receiver 5 may be an assisted GPS (A-GPS) receiver, which can obtain almanac; ephemeris; or potentially full satellite data-message records from an assistance server. The server may gather this information from a fixed GPS receiver or a network of receivers dispersed around the world. Each of these reference receivers reports decoded satellite data messages to the central database. Alternatively, the aiding data could be gathered dynamically from a network of mobile GPS receivers. That is, each GPS receiver would share its own, fragmentary observations of satellite data messages with the central server. The server would aggregate these observations to form a complete record, which could then be accessed by all receivers. As noted above, communication with a data-aiding server can be by any convenient means, but will usually be via a wireless data connection of some kind.

Nominally stale satellite trajectory data may be enhanced by using more advanced techniques to extrapolate the orbits of the satellites. For example, models of the movement, interaction and gravitational influence of celestial bodies (like the earth, sun and moon) may be used generate better estimates of satellite trajectory. This can allow ephemeris and almanac information to be used far outside (either before or after) the normal period of validity.

The mode in which the receiver 5 operates may be selected based on the availability of valid satellite trajectory data (for example, ephemeris). In other embodiments, the selection of operation mode may be based on other indicators. For example, the receiver 5 may process samples in real-time (the first mode) when the device is connected to an external power supply. This means that the energy-intensive processing needed for live position-calculation is only engaged when an external power source is present. When the device is running on internal battery power, it operates in the second mode (storing samples or pseudo-ranges, without calculating position fixes) to extend battery life.

In addition, or alternatively, detection of an external power supply can also be used to trigger the processing of data that has been stored in the memory (while the device was operating in the second mode). That is, in response to connection to an external power supply the receiver may enter the third mode. Note that the processing functions of the third mode may be performed in parallel with those of the first and second modes. That is, the first and third modes, and the second and third modes, are not mutual exclusive.

Note that the embodiments above have been described with reference to a super-heterodyne receiver architecture, in which RF signals are down-mixed to an intermediate frequency. Of course, those skilled in the art will readily appreciate that identical principles apply to a direct conversion receiver. Indeed, such a receiver can simply be considered to have an intermediate frequency of zero.

Similarly, the embodiment of FIG. 1 shows a receiver in which both the real-time clock (RTC) 24 and the frequency synthesizer 14 derive their clock signals from the same source—that is, a master reference oscillator 16 operating from a single crystal. Of course, the applicability of the invention is not limited to this architecture. In another embodiment, the RTC 24 may be driven by a separate, slower-running RTC oscillator using its own crystal, for instance a 32.768 kHz RTC crystal. Thus, the clock signal driving the RTC can be independent from that driving the frequency synthesizer 14.

As will be readily apparent, the present invention is not limited to the calculation of position estimates. Other parameters such as velocity may of course be calculated in addition. For example, it is well known to calculate velocity from the Doppler shifts of satellite positioning signals, once the position of a receiver is known.

In some embodiments, in addition to the conventional filtering in the RF front-end, further filtering of the received GPS signals may be performed after the signals have been sampled. For example, US 2008/0240315 describes methods and circuits for interference suppression. The filtering can be part of the RF front-end or part of the base-band processing. Digital filtering of this kind may be adaptive. That is, the sampled signals may be analysed to determine if interference is present and, if so, to measure the properties of the interference (for example, frequency or power). The digital filtering can then be adapted automatically to cancel or attenuate the interference optimally. It may be particularly beneficial to perform filtering at a higher sample rate (as output by the analogue-to-digital converter) and then to decimate the filtered signal samples to a lower rate before storing or processing them. Alternatively or in addition to decimation, the bit-width (that is, bit-resolution) of each sample may be reduced after such processing. If the samples are to be stored, this reduces both the volume of storage and the throughput demands on the memory interface. If the samples are to be processed immediately, decimation and/or bit-resolution reduction can reduce power consumption and/or complexity of the processing hardware. However, by filtering beforehand, the quality of the resulting reduced-resolution signals is likely to be greater.

Herein, references to "sampling" received signals and "storing" resultant signal samples should therefore be taken to include the possibility of additional filtering between the sampling step (analogue-to-digital conversion) and the step of storing the samples.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The embodiments described above have concentrated on satellite positioning using GPS. However, those skilled in the art will appreciate that the scope of the invention is not limited to the use of GPS. The same principles are equally applicable to other satellite positioning systems. These are known generically as "Global Navigation Satellite Systems" (GNSS). Other examples of a GNSS include, but are not limited to, the Russian "Global Navigation Satellite System" (GLONASS) and the European project, "Galileo".

Although the present invention is concerned with satellite positioning systems, those skilled in the art will appreciate that the same or similar techniques can also be applied to positioning systems in which the reference beacons are not space vehicles For example, positioning by means of "pseudolites" has been proposed as an alternative to satellite positioning. Pseudolites are typically terrestrial transmitters which broadcast a signal that is analogous (or identical) to the signals transmitted by GPS satellites. Thus a pseudolite may use the same L1 frequency used by the GPS satellites, and a similar spread-spectrum modulation scheme. To the extent that pseudolite signals can be processed in the same way as satellite positioning signals, the present specification should be taken as disclosing equivalent techniques for calculating a second position fix from pseudolite signals, assisted by reference information associated with the calculation of a first position fix.

The invention claimed is:

1. A satellite positioning receiver (5) comprising:
 an RF front end (12), for receiving satellite positioning signals;
 an analogue-to-digital converter (18), for sampling the received signals to generate signal samples;
 a memory (22); and
 a processor (20), for processing the signal samples to derive ranging measurements and to calculate a position fix,
 the receiver (5) having a first mode in which the processor (20) is operable:
  to process a first set of the samples as they are generated, to calculate a first position fix;
  to store in the memory (22) information associated with this calculation;
  to process a third set of the samples as they are generated, to calculate a third position fix; and
 to store in the memory (22) information associated with this calculation,
 the receiver (5) having a second mode in which it is operable to store a second set of the samples, or ranging measurements derived from the second set of samples, in the memory (22) for later processing to calculate a second position fix,
 the receiver having a third mode in which the processor (20) is operable:
  to retrieve the stored second set of samples or ranging measurements from the memory; and
  to process them to calculate the second position fix,
  wherein said processing is assisted by the information associated with the calculation of the first position fix and the information associated with the calculation of the third position fix.

2. The receiver of claim 1, wherein the information associated with the calculation of the first position fix that is used to assist the calculation of the second position fix comprises one or more of:
 the first position;
 a velocity associated with the first position;
 a time at which the first set of samples was received;
 a list of one or more satellites whose signals were detected in the first set of samples;
 a detected carrier frequency of such a satellite;
 a detected Doppler shift of such a carrier frequency;
 a ranging measurement derived from the first set of samples;
 a differential correction applied to such a ranging measurement;
 ephemeris data used in the calculation of the first position fix;
 a portion of a data message transmitted by a satellite;
 satellite-health information;
 satellite clock-correction data; and
 an uncertainty parameter associated with any of the foregoing.

3. The receiver of claim 1, wherein the receiver (5) adapted to store in the memory (22) a time-stamp associated with the receipt of the first set of samples, the second set of samples, or both.

4. The receiver (5) of claim 1, wherein the processor is adapted to measure an elapsed time between receiving the first set of samples and receiving the second set of samples.

5. The receiver of claim wherein the calculation of the second position fix is assisted by one or both of:
predicting ephemeris data suitable for calculating the second position fix based on ephemeris data used to calculate the first position fix; and
predicting a code phase of the spreading code for one or more satellites in the second set of signal samples, based on at least one code phase that was determined in the process of calculating the first position fix.

6. The receiver of claim 1, wherein the calculation of the second position fix is assisted by linear or non-linear prediction of the value of at least one parameter, based on values of that parameter that are associated with the first and third positions.

7. The receiver of claim 1, further adapted to enter the first mode periodically, and in that mode to process a set of samples as they are generated, to calculate a position fix; and to store in the memory information associated with this calculation.

8. A satellite positioning receiver (5) comprising:
an RF front end (12), for receiving satellite positioning signals;
an analogue-to-digital converter (18), for sampling the received signals to generate signal samples;
a memory (22); and
a processor (20), for processing the signal samples to derive ranging measurements and to calculate a position fix,
the receiver (5) having a first mode in which the processor (20) is operable:
to process a first set of the samples as they are generated, to calculate a first position fix;
to store in the memory (22) information associated with this calculation;
to process a third se of the samples as they are generated, to calculate a third position fix; and
to store in the memory information associated with this calculation,
the receiver (5) having a second mode in which it is operable to store a second set of the samples, or ranging measurements derived from the second set of samples, in the memory for later processing to calculate a second position fix,
wherein the receiver is adapted to upload the information and the second set of samples or ranging measurements stored in the memory (22) to an external device (30), by which external device (30) the second set of samples or ranging measurements can be processed to calculate the second position fix, said processing being assisted by the information associated with the calculation of the first position fix and the information associated with the calculation of the third position fix.

9. The receiver of claim 8, wherein the receiver is adapted:
to store in the memory a time-stamp associated with the receipt of the first set of samples, the second set of samples, or both; and
to upload said time-stamp or time-stamps to the external device.

10. The receiver of claim 8, wherein the processor is adapted to measure an elapsed time between receiving the first set of samples and receiving the second set of samples.

11. A method of calculating a position fix from previously stored satellite signal samples, the method comprising:
receiving (200, 210) from a satellite positioning receiver:
(200) information associated with the calculation of a first position fix calculated by the receiver from a first set of satellite signal samples;
information associated with the calculation of a third position fix calculated by the receiver from a third set of satellite signal samples; and
(210) a second set of satellite signal samples, or ranging measurements derived from a second set of satellite signal samples, and
processing (150a) the second set of samples or the ranging measurements to calculate a second position fix,
wherein said processing is assisted by the information associated with the calculation of the first position fix and the information associated with the calculation of the third position fix.

12. The method of claim 11, wherein the information associated with the calculation of the first position fix that is used to assist the calculation of the second position fix comprises knowledge of one or more of:
the first position;
a velocity associated with the first position;
a time at which the first set of samples was received;
a list of one or more satellites whose signals were detected in the first set of samples;
a detected carrier frequency of such a satellite;
a detected Doppler shift of such a carrier frequency;
a ranging measurement derived from the first set of samples;
a differential correction applied to such a ranging measurement;
ephemeris data used in the calculation of the first position fix;
a portion of a data message transmitted by a satellite;
satellite-health information; and
satellite clock correction data.

13. A method of calculating three position fixes, using satellite positioning, the method comprising:
using an RF front-end, receiving (100) satellite positioning signals;
using an analogue-to-digital converter, sampling (110) the received signals to generate signal samples;
using a processor, processing (120) a first set of the samples as they are generated, to calculate a first position fix;
storing (130) information associated with the calculation in a memory;
using the processor, processing (120) a third set of the samples as they are generated, to calculate a third position fix;
storing (130) information associated with the calculation in a memory;
storing (140) a second set of the samples, or ranging measurements derived from the second set of samples, in the memory for later processing to calculate a second position fix; and
later, processing (150; 150a) the second set of samples to calculate the second position fix, wherein the calculation of the second position fix is assisted by the information associated with the calculation of the first position fix and the information associated with the calculation of the third position fix.

14. A computer program comprising computer program code means adapted to control a physical computing device to perform all the steps of claim 12 if said program is run on a computer.

15. A computer program comprising computer program code means adapted to control a physical computing device to perform all the steps of claim 13 if said program is run on a computer.

* * * * *

UNITED STATES PATENT AND TRADEMARK OFFICE
CERTIFICATE OF CORRECTION

PATENT NO. : 8,614,641 B2
APPLICATION NO. : 13/160424
DATED : December 24, 2013
INVENTOR(S) : Andrew Thomas Yule et al.

It is certified that error appears in the above-identified patent and that said Letters Patent is hereby corrected as shown below:

In the Claims

Column 19, Claim 3, line 1, delete "(5) adapted" and insert --(5) is adapted--.

Column 19, Claim 5, line 8, delete "claim wherein" and insert --claim 1 wherein--.

Column 19, Claim 8, line 44, delete "se of" and insert --set of--.

Signed and Sealed this
Second Day of September, 2014

Michelle K. Lee
*Deputy Director of the United States Patent and Trademark Office*